US012576484B2

(12) United States Patent
Gaskie

(10) Patent No.: US 12,576,484 B2
(45) Date of Patent: Mar. 17, 2026

(54) HINGED WRENCH

(71) Applicant: Ryan Keith Gaskie, Forney, TX (US)

(72) Inventor: Ryan Keith Gaskie, Forney, TX (US)

(73) Assignee: Ryan Keith Gaskie, Forney, TX (US)

( * ) Notice: Subject to any disclaimer, the term of this patent is extended or adjusted under 35 U.S.C. 154(b) by 385 days.

(21) Appl. No.: 18/200,955

(22) Filed: May 23, 2023

(65) Prior Publication Data

US 2024/0391063 A1 Nov. 28, 2024

(51) Int. Cl.

*B25B 13/28* (2006.01)
*B25B 13/04* (2006.01)
*B25B 13/08* (2006.01)

(52) U.S. Cl.

CPC .............. *B25B 13/28* (2013.01); *B25B 13/04* (2013.01); *B25B 13/08* (2013.01)

(58) Field of Classification Search

CPC ......... B25B 13/04; B25B 13/06; B25B 13/08; B25B 13/10; B25B 13/28

See application file for complete search history.

(56) References Cited

U.S. PATENT DOCUMENTS

| | | | | | | |
|---|---|---|---|---|---|---|
| 6,077 | A | * | 1/1849 | Hay | B25B 13/505 | 81/98 |
| 202,089 | A | * | 4/1878 | Badcock | B25B 13/46 | 81/90.1 |
| 235,083 | A | * | 12/1880 | Haigh | B25B 13/28 | 81/99 |
| 278,264 | A | * | 5/1883 | Patton | B25B 13/505 | 81/98 |
| 459,559 | A | * | 9/1891 | Bird | B25B 13/28 | 81/99 |
| 623,337 | A | * | 4/1899 | Birger | B25B 13/18 | 81/391 |
| 1,258,381 | A | * | 3/1918 | Webb, Jr. | B25B 13/463 | 81/61 |
| 1,258,382 | A | * | 3/1918 | Webb, Jr. | B25B 13/463 | 81/58.5 |
| 1,411,970 | A | * | 4/1922 | Ligon | F16B 2/08 | 81/125 |
| 1,640,256 | A | | 8/1927 | Small | | |
| 1,754,717 | A | * | 4/1930 | Hughens | B25B 23/0071 | 81/125 |
| 1,805,884 | A | | 5/1931 | Pawsat | | |
| 2,484,492 | A | * | 10/1949 | Dingley | B25B 13/04 | 81/124.3 |
| 3,668,950 | A | | 6/1972 | Tyler | | |
| 3,741,047 | A | | 6/1973 | Kanowsky | | |
| 4,967,612 | A | * | 11/1990 | Sparling | B25B 13/04 | 81/111 |
| 5,131,300 | A | * | 7/1992 | Daniel | B25B 13/481 | 81/111 |

(Continued)

*Primary Examiner* — David B. Thomas
(74) *Attorney, Agent, or Firm* — PATENT CAPITAL GROUP

(57) ABSTRACT

There is disclosed a wrench, having a first body piece and a second body piece, wherein the first body piece and second body piece are of substantially identical construction, and wherein the second body piece is oriented 180° from the first body piece along a longitudinal axis, and wherein the first and second body pieces have respective head pieces that, when closed together, form a box-end wrench head, and wherein the first and second body pieces are joined at a pivot joint on the box-end wrench head.

20 Claims, 9 Drawing Sheets

(56) References Cited

U.S. PATENT DOCUMENTS

| | | | | |
|---|---|---|---|---|
| 6,745,651 | B2 | 6/2004 | Porter | |
| 7,004,214 | B1 * | 2/2006 | Awad | B25B 7/02<br>141/351 |
| 7,156,001 | B2 * | 1/2007 | Cluthe | B25B 13/10<br>81/145 |
| 8,006,591 | B2 * | 8/2011 | Fan | B25B 13/28<br>81/111 |
| 8,342,063 | B2 * | 1/2013 | Stanton | B25B 13/08<br>81/186 |
| 8,561,504 | B2 * | 10/2013 | Buchanan | B25B 13/04<br>81/177.85 |
| 9,434,055 | B2 * | 9/2016 | Tunningley | B25B 13/28 |
| 11,446,795 | B2 * | 9/2022 | Chen | B25B 13/08 |
| 2003/0172782 | A1 | 9/2003 | Saunders | |
| 2008/0289454 | A1 * | 11/2008 | Petkovic | B25B 13/46<br>81/111 |
| 2017/0001285 | A1 * | 1/2017 | Chen | B25B 13/08 |
| 2020/0171642 | A1 * | 6/2020 | Newman | B25F 1/003 |
| 2021/0046619 | A1 * | 2/2021 | Nemeth | B25B 23/16 |

* cited by examiner

HINGED WRENCH

FIELD OF THE SPECIFICATION

This specification relates to the field of hand tools and more specifically, though not exclusively, to a hinged wrench.

BACKGROUND

Wrenches are a class of tool that can be used to turn fasteners.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various elements illustrated herein disclose only one illustrative arrangement of those elements. Illustrated elements may be rearranged in different configurations, and elements shown in one configuration may, in appropriate circumstances, be moved to a different arrangement or configuration.

SUMMARY

Figure 1:
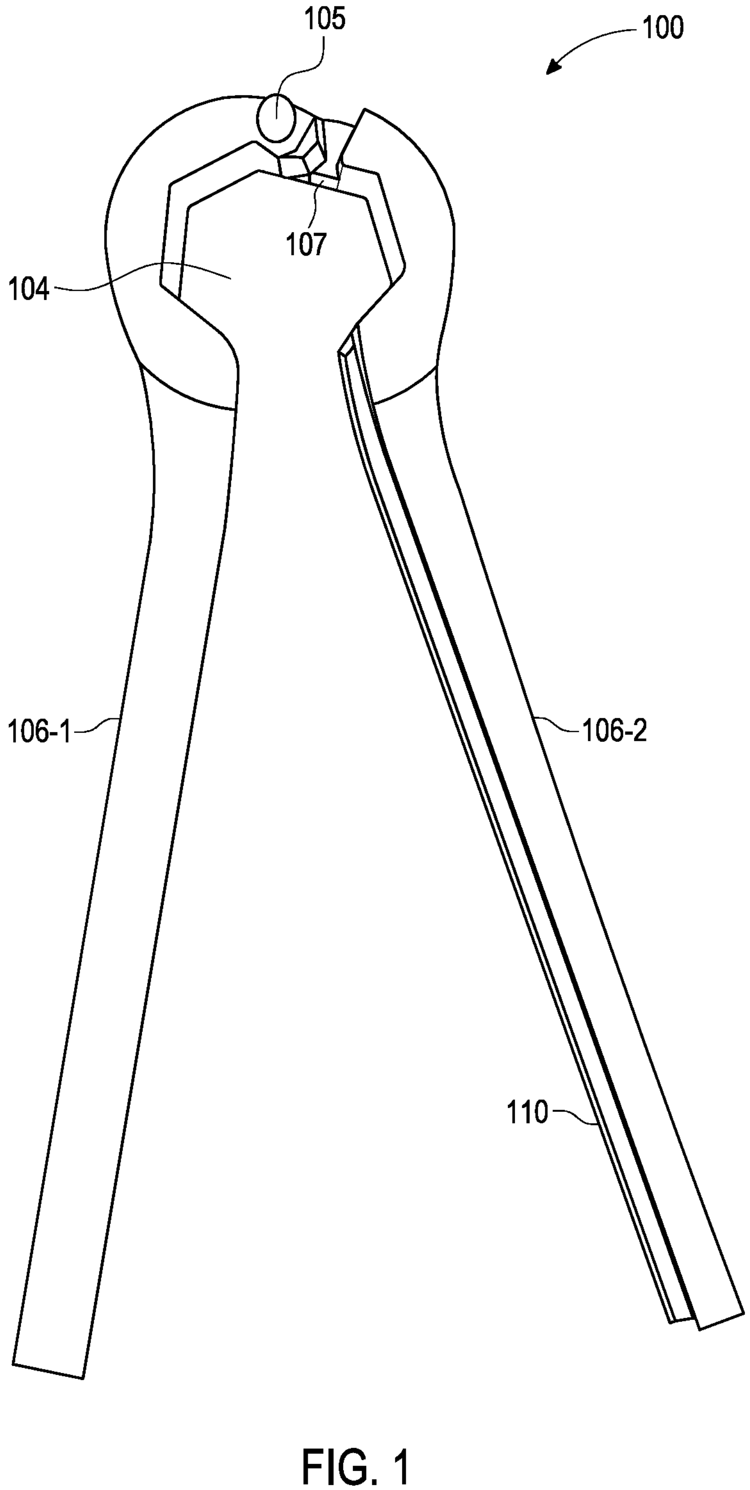
FIG. 1 is a perspective view of an illustrative embodiment of a hinged wrench.

There is disclosed a wrench, having a first body piece and a second body piece, wherein the first body piece and second body piece are of substantially identical construction, and wherein the second body piece is oriented 180° from the first body piece along a longitudinal axis, and wherein the first and second body pieces have respective head pieces that, when closed together, form a box-end wrench head, and wherein the first and second body pieces are joined at a pivot joint on the box-end wrench head.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

As a class of tools, wrenches are hundreds of years old, with the first recorded use being at least as early as the 16th century. Wrenches are most commonly used to turn rotary fasteners such as nuts, bolts, screws, or joints. Structurally, a wrench includes two elements that provide a mechanical advantage.

The first element is the wrench head, which commonly has either 6 or 12 points, and may be manufactured with a tight tolerance to a standard size for the rotary fastener. For example, a 10-millimeter (mm) nut or bolt may have a hexagonal head with well-defined dimensions. As specified by International Standards Organization (ISO) standards, a 10 mm metric shoulder bolt has a head diameter of 16 mm, a head height of 7 mm, a thread length of 13.25 mm, and a thread of 8-by-1.25 mm.

The second element is the wrench handle, which provides torque. The handle protrudes from the end of the wrench head, and provides torque proportional to the length of the handle, i.e., $\tau = f \times D$.

Of particular interest in this application is the head diameter of 16 mm. The nominal size of the bolt head is the distance measured between two parallel surfaces. Thus, for a 10 mm bolt in a hexagonal shape, it is nominally 10 mm between any two parallel surfaces of the parallel sides of the bolt head. Wrenches are manufactured to standards such as American Society of Mechanical Engineers (ASME)/American National Standards Institute (ANSI) standard B18.2.2, which specifies tolerances for the wrench. The wrench opening is commonly 1% to 2% larger than the nominal size of the bolt head to allow room for the wrench to fit around the bolt, or other rotary fastener.

Wrenches (or "spanners" in British English) often come in one of two configurations. The simplest wrench has a crescent or open head, which for example in a six-point head configuration has only four sides. This open configuration allows the wrench head to fit around the fastener. A second common configuration is the box head (or "round head" in British English), which is fully enclosed and may contain a full 6 points, or more commonly, 12 points. A box head may be able to grip the fastener more securely because it has more contact surfaces, but can only be used in cases where the head can be slid over the top of the fastener. Popular wrench sets often include a handle with an open crescent head at one end, and a box head at the other end.

The present specification describes a hinged wrench that realizes advantages of both an open head and a box head. The hinged wrench may include, for example, a box head with a hinged joint that allows the box head to open. A split handle enables a user to open the hinged wrench, secure the hinged wrench around a fastener, close the hinged wrench, and then apply torque to tighten or loosen the fastener. This enables the wrench to work on fasteners that otherwise may be difficult to access, and may provide a more secure grip on the fastener, thus helping to prevent stripping or rounding of the head.

For example, open ended wrenches are generally used on fasteners that do not have at least one open end over which the box head can be slipped. But the wrench described herein can be opened and slipped around the fastener (e.g., a nut), even if there is no open end on the fastener. The wrench can then be closed around the fastener and manipulated. This realizes advantages of an open-ended wrench, while also providing advantages of a box head wrench (e.g., greater contact surface).

Embodiments of the hinged wrench may be constructed, for example, of chrome vanadium, stainless steel, or other materials. The wrenches may be chrome plated for protection. In one illustrative example, the wrench is drop forged in two pieces. Drop forging is a manufacturing process in which a block of metal is heated to a high temperature until it is malleable. A heavy stamp is then dropped onto the metal block from a specified height, and the kinetic energy of the stamp molds the heated metal into the desired shape. In an embodiment, a hinged wrench may be manufactured from two identical pieces, with a lip at the apex where a pin can be attached to affix the two pieces to one another and provide the hinge. The handle piece may also optionally have a lip that provides a more secure joint when the wrench is closed.

Selected Examples

The foregoing can be used to build or embody several example implementations, according to the teachings of the present specification. Some example implementations are included here as nonlimiting illustrations of these teachings.

Example 1 includes a wrench, comprising a first body piece and a second body piece, wherein the first body piece and second body piece are of substantially identical construction, and wherein the second body piece is oriented 180° from the first body piece along a longitudinal axis, and wherein the first and second body pieces comprise respective head pieces that, when closed together, form a box-end wrench head, and wherein the first and second body pieces are joined at a pivot joint on the box-end wrench head.

Example 2 includes the wrench of example 1, wherein the first and second body pieces comprise respective lips on respective head pieces, and wherein the pivot joint comprises a pin through the respective lips.

Example 3 includes the wrench of example 1, wherein the first and second body pieces comprise respective handle pieces, wherein the respective handle pieces form reciprocal lips.

Example 4 includes the wrench of example 1, wherein the box-end wrench head is a six-point wrench head.

Example 5 includes the wrench of example 1, wherein the box-end wrench head is a twelve-point wrench head.

Example 6 includes the wrench of example 1, wherein the first and second body pieces are drop forged.

Example 7 includes the wrench of example 1, wherein the first and second body pieces are chrome-vanadium.

Example 8 includes the wrench of example 1, wherein the first and second body pieces further comprise tail pieces at removed ends from the respective head pieces, wherein the tail pieces, when closed, form an open-ended wrench head.

Example 9 includes the wrench of example 8, wherein the open-ended wrench head is a six-point wrench head.

Example 10 includes the wrench of example 8, wherein the open-ended wrench head is a twelve-point wrench head.

Example 11 includes the wrench of example 1, further comprising securing means to secure the first body piece to the second body piece when closed.

Example 12 includes the wrench of example 11, wherein the securing means comprise magnetic means.

Example 13 includes the wrench of example 11, wherein the securing means comprise mechanical means.

Example 14 includes the wrench of example 13, wherein the mechanical means comprise a clasp.

Example 15 includes the wrench of example 13, wherein the mechanical means comprise a loop.

Example 16 includes a method of manufacturing a wrench, comprising: forming a first body piece comprising a first head piece and a first handle; forming a second body piece comprising a second head piece and a second handle, wherein the second body piece is of substantially identical construction to the first body piece; inverting the second body piece along a longitudinal axis; and pinning the first head piece to the second head piece at a pivot joint, wherein the first head piece and second head piece together form a box-end wrench head.

Example 17 includes the method of example 16, wherein the first and second body pieces comprise respective lips on respective head pieces, and wherein the pivot joint connects through the respective lips.

Example 18 includes the method of example 16, wherein the first and second handles form reciprocal lips.

Example 19 includes the method of example 16, wherein the box-end wrench head is a six-point wrench head.

Example 20 includes the method of example 16, wherein the box-end wrench head is a twelve-point wrench head.

Example 21 includes the method of example 16, wherein forming the first and second body pieces comprises drop forging.

Example 22 includes the method of example 16, wherein forming the first and second body pieces comprises casting.

Example 23 includes the method of example 16, wherein the first and second body pieces are chrome-vanadium.

Example 24 includes the method of example 16, wherein the first and second body pieces further comprise tail pieces at removed ends from the respective head pieces, wherein the tail pieces, when closed, form an open-ended wrench head.

Example 25 includes the method of example 24, wherein the open-ended wrench head is a six-point wrench head.

Example 26 includes the method of example 24, wherein the open-ended wrench head is a twelve-point wrench head.

Example 27 includes the method of example 16, further comprising magnetizing at least one of the body pieces.

Example 28 includes the method of example 16, further comprising affixing a clasp to one of the body pieces, and a matching clasp peg to the other body piece.

Example 29 includes the method of example 16, further comprising affixing a loop to one of the body pieces, wherein the loop is sized to securely fit over the other body piece.

Example 30 includes a wrench manufactured according to the method of any of examples 16-29.

Example 31 includes a wrench, comprising: a first body piece, comprising a first head piece and a first handle; and a second body piece, comprising a second head piece and a second handle, wherein the second head piece is pivotally affixed to the first head piece, and wherein the first head piece and second head piece together form, when closed, a box-end wrench head; wherein the second handle is shaped to slide over and secure to the first handle when closed.

Example 32 includes the wrench of example 31, wherein the second handle is spring biased to remain closed over the first handle.

Example 33 includes the of example 31, wherein the first and second body pieces comprise respective lips on respective head pieces, and wherein the second body piece is pivotally affixed to the first body piece through the respective lips.

Example 34 includes the wrench of example 31, wherein the box-end wrench head is a six-point wrench head.

Example 35 includes the wrench of example 31, wherein the box-end wrench head is a twelve-point wrench head.

Example 36 includes the wrench of example 31, wherein the first and second body pieces are drop forged.

Example 37 includes the wrench of example 31, wherein the first and second body pieces are chrome-vanadium.

Example 38 includes the wrench of example 31, wherein the first and second body pieces further comprise tail pieces at removed ends from the respective head pieces, wherein the tail pieces, when closed, form an open-ended wrench head.

Example 39 includes the wrench of example 38, wherein the open-ended wrench head is a six-point wrench head.

Example 40 includes the wrench of example 38, wherein the open-ended wrench head is a twelve-point wrench head.

Example 41 includes a method of manufacturing a wrench, comprising: forming a first body piece, comprising a first head piece and a first handle; forming a second body piece, comprising a second head piece and a second handle, wherein the second handle is shaped to slide over and secure to the first handle when closed; and pivotally affixing the second head piece to the first head piece, such that the first head piece and second head piece together form, when closed, a box-end wrench head.

Example 42 includes the method of example 41, further comprising spring biasing the second handle to remain closed over the first handle.

Example 43 includes the method of example 41, wherein the first and second body pieces comprise respective lips on respective head pieces, and wherein the second body piece is pivotally affixed to the first body piece through the respective lips.

Example 44 includes the method of example 41, wherein the box-end wrench head is a six-point wrench head.

Example 45 includes the method of example 41, wherein the box-end wrench head is a twelve-point wrench head.

Example 46 includes the method of example 41, wherein forming the first and second body pieces comprises drop forging.

Example 47 includes the method of example 41, wherein forming the first and second body pieces comprises casting.

Example 48 includes the method of example 41, wherein the first and second body pieces are chrome-vanadium.

Example 49 includes the method of example 41, wherein the first and second body pieces further comprise tail pieces at removed ends from the respective head pieces, wherein the tail pieces, when closed, form an open-ended wrench head.

Example 50 includes the method of example 49, wherein the open-ended wrench head is a six-point wrench head.

Example 51 includes the method of example 49, wherein the open-ended wrench head is a twelve-point wrench head.

Example 52 includes a wrench made according to the method of any of examples 41-51.

DETAILED DESCRIPTION OF THE DRAWINGS

A hinged wrench and a method of manufacturing the same will now be described with more particular reference to the attached FIGURES. It should be noted that throughout the FIGURES, certain reference numerals may be repeated to indicate that a particular device or element is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a perspective view of an illustrative embodiment of a hinged wrench 100. In this example, hinged wrench 100 is manufactured from two pieces. The two pieces together form a variable box head 104 with two handles, namely handle 106-1 and handle 106-2. Handle 106-2 has a visible lip 110, which may slide under a reciprocal lip of handle 106-1, which reciprocal lip is not visible in this view. A lip 107 is visible, and joins to a reciprocal lip on the other side. A pin 105 passes through the two lips 107 to secure hinged wrench 100 and form variable box head 104.

In operation, a user may manipulate hinged wrench 100 by pulling apart handles 106, slipping variable box head 104 around the fastener, and then closing handles 106. The reciprocal or overlapping lips 110 provide good contact of the handles 106, and the user can then manipulate the fastener. For wrenches under approximately 1 inch, 1 inch (approximately 26 mm) handgrip strength alone may be sufficient to provide a good grip on the fastener. For larger wrenches, it may be beneficial to provide supplemental securing means for the handles.

Figure 2:
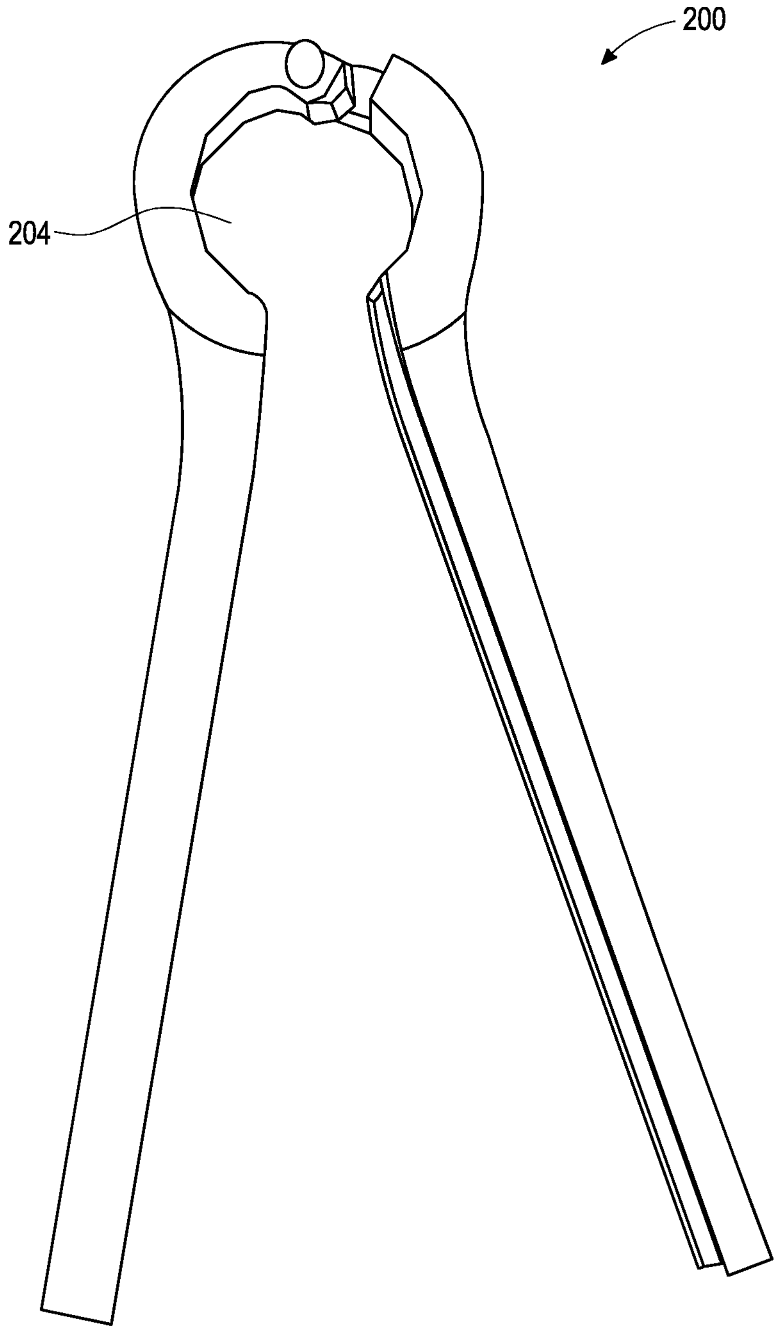
FIG. 2 is a perspective view of a 12-point hinged wrench.

FIG. 2 is a perspective view of a 12-point hinged wrench 200. 12-point hinged wrench 200 is substantially similar to hinged wrench 100 of FIG. 1, and includes many of the same elements. In this embodiment, variable box head 204 includes 12 points instead of 6 points. 12-point configurations are common for box head wrenches. A 12-point wrench provides greater freedom of movement, because there are twice as many points at which the head can grip the fastener. However, in some applications, a 12-point head may incur a greater risk of rounding the fastener head, because there is less overall contact surface than with a 6-point head. This figure illustrates that a hinged wrench can be provided in either a 6-point configuration or a 12-point configuration—or other, less common configurations—to meet the needs of a particular configuration.

Figure 3:
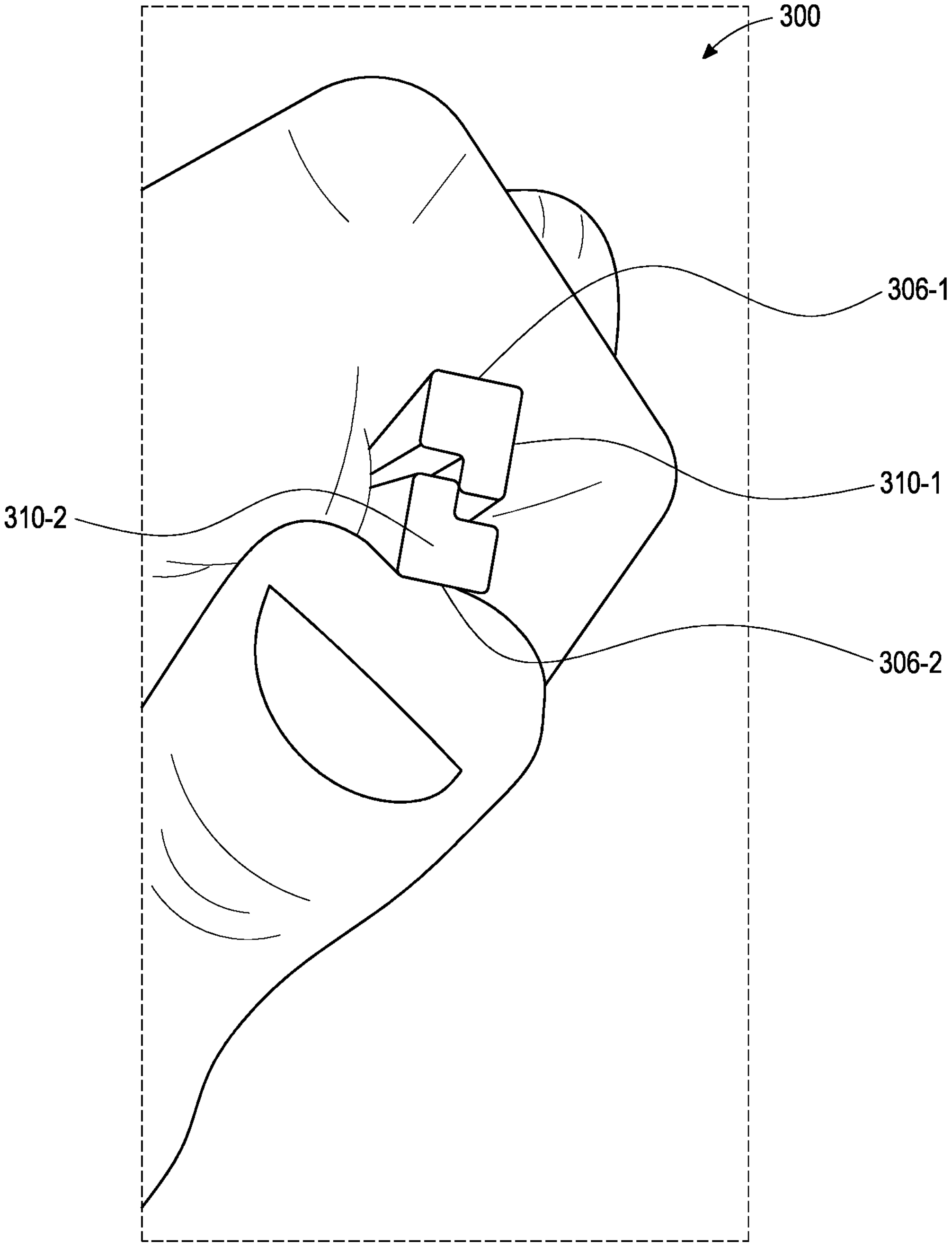
FIG. 3 is a perspective view of selected elements of a hinged wrench.

FIG. 3 is a perspective view of selected elements of a hinged wrench 300. This view illustrates more particularly certain aspects of the handle. Wrench 300 includes handle 306-1 and handle 306-2. In this view, lip 310-1 and lip 310-2 are both visible. Here, it can be seen that the two lips are reciprocal to one another, thus providing a good grip and contact surface when variable wrench 300 is closed. This can help to prevent slippage and provide a more secure wrench.

Figure 4:
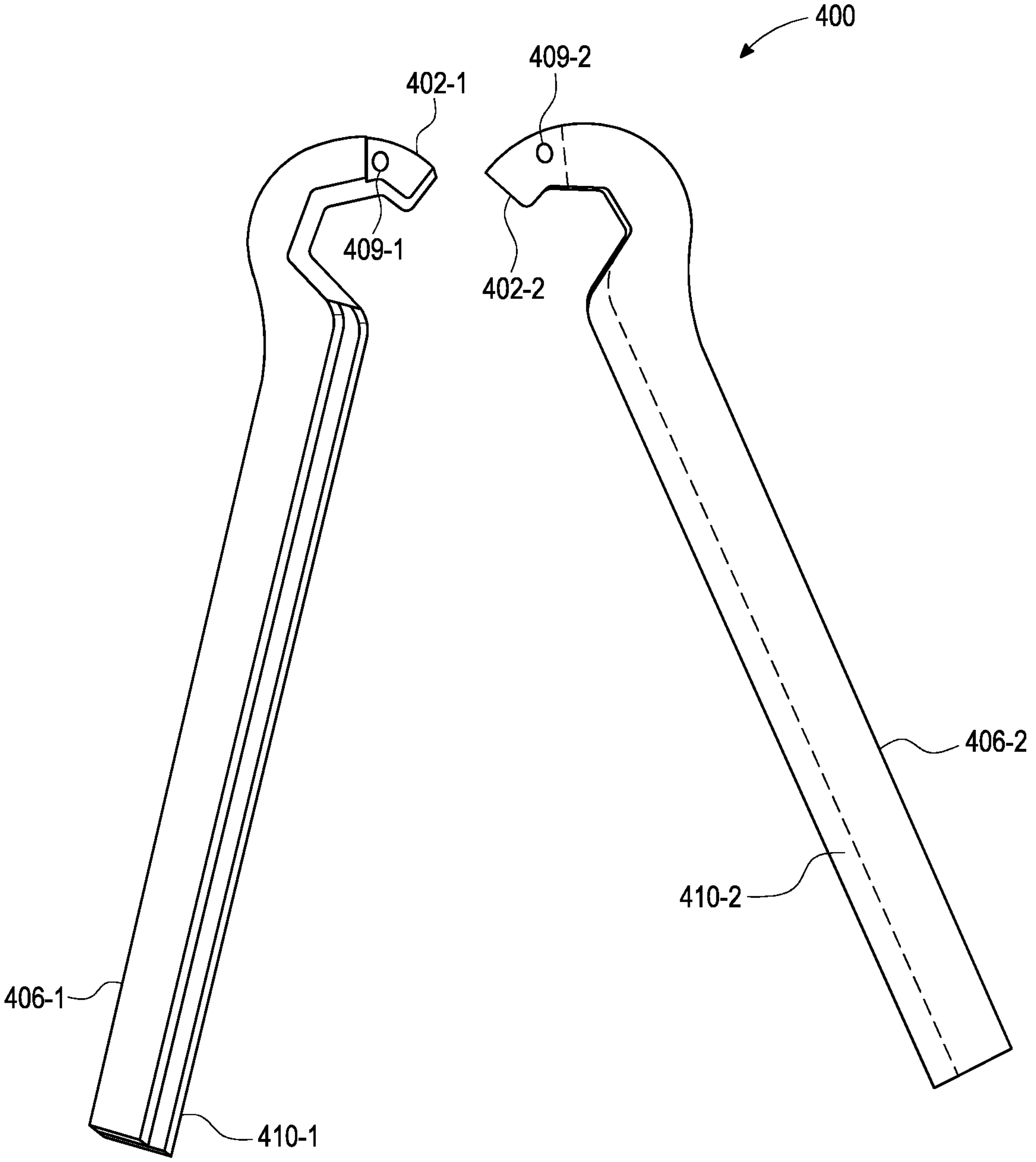
FIG. 4 is a perspective view illustration of manufacturing elements of a wrench.

FIG. 4 is a perspective view illustration of manufacturing elements of a wrench 400. In this example, wrench 400 can be manufactured from two pieces, namely piece 402-1 and piece 402-2. Each piece 402 includes a respective handle 406-1 and 406-2, and lip 410-1 and 410-2. These pieces may be manufactured from a common material such as chrome vanadium, stainless steel, or other suitable material. In an illustrative embodiment, the two pieces 402 are drop forged separately. Advantageously, pieces 402-1 and 402-2 may be manufactured to be identical to one another. Thus, a manufacturing line can be introduced that manufactures pieces 402 in volume. Final assembly may involve selecting any two pieces 402 (subject to quality control considerations) and combining the two to make a wrench 400. In this case, piece 402-2 may be flipped over, or in other words, inverted or rotated 180 degrees along a longitudinal axis (i.e., an axis that runs along the length of handle 406). Lip 407-2 may be placed over the top of lip 407-1, and a fastener may be passed through pin holes 409-1 and 409-2. The fastener through the pin holes 409 forms the hinged joint of wrench 400. Handles 406 have reciprocal lips 410-1 and 410-2.

Figure 5:
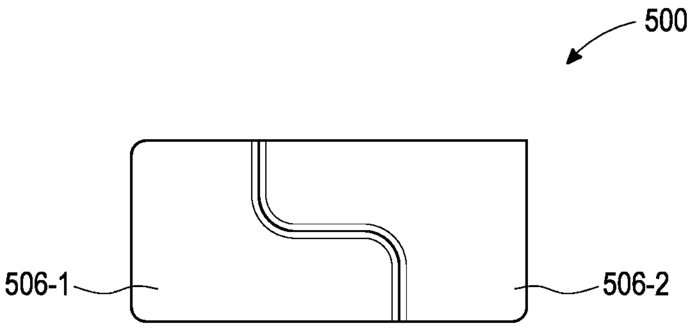
FIG. 5 is a bottom view of selected elements of a wrench.

FIG. 5 is a bottom view of selected elements of a wrench 500. Wrench 500 visibly includes handle 506-1 and handle 506-2, with reciprocal lips that fit snugly together to provide a good grip.

Figure 6:
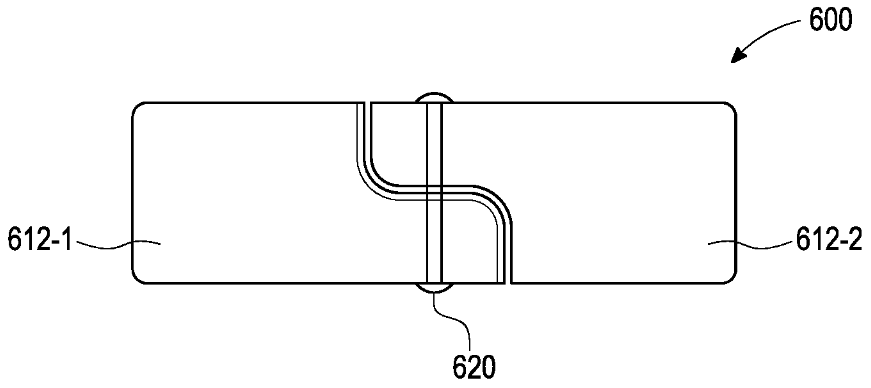
FIG. 6 is a top view of selected elements of a wrench.

FIG. 6 is a top view of selected elements of a wrench 600. Visible in wrench 600 is head 612-1 and head 612-2. As illustrated in FIG. 4, the wrenches of FIG. 5 and FIG. 6 may be manufactured from identical pieces. Heads 612 have reciprocal lips, and a pin 620 passes through the pinholes to secure the lips. The two heads 612 may be manufactured with enough clearance around the lips so that the wrench can open and close.

Figure 7:
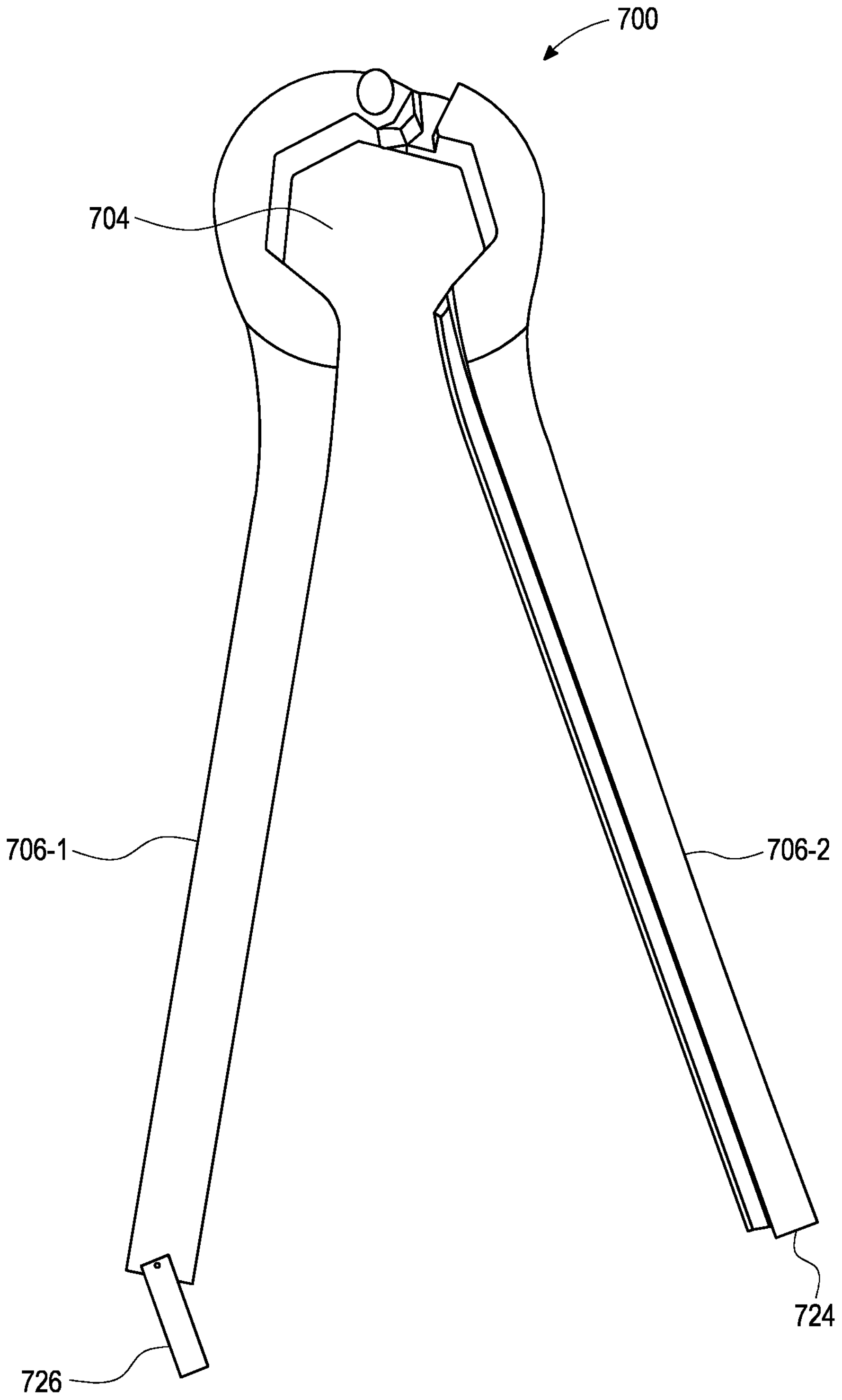
FIG. 7 is a perspective view illustration of an additional embodiment of a hinged wrench.

FIG. 7 is a perspective view illustration of an additional embodiment of a hinged wrench 700. As in other embodiments, hinged wrench 700 includes a variable box head 704, and handles 706-1 and 706-2 with reciprocal lips. In this embodiment, a securing loop 726 is hingedly affixed to handle 706-1. When hinged wrench 700 is closed, securing loop 726 may be looped over butt 724 of handle 706-2. This may help to better secure hinged wrench 700, without relying exclusively on the grip force of a user operating the wrench.

Figure 8:
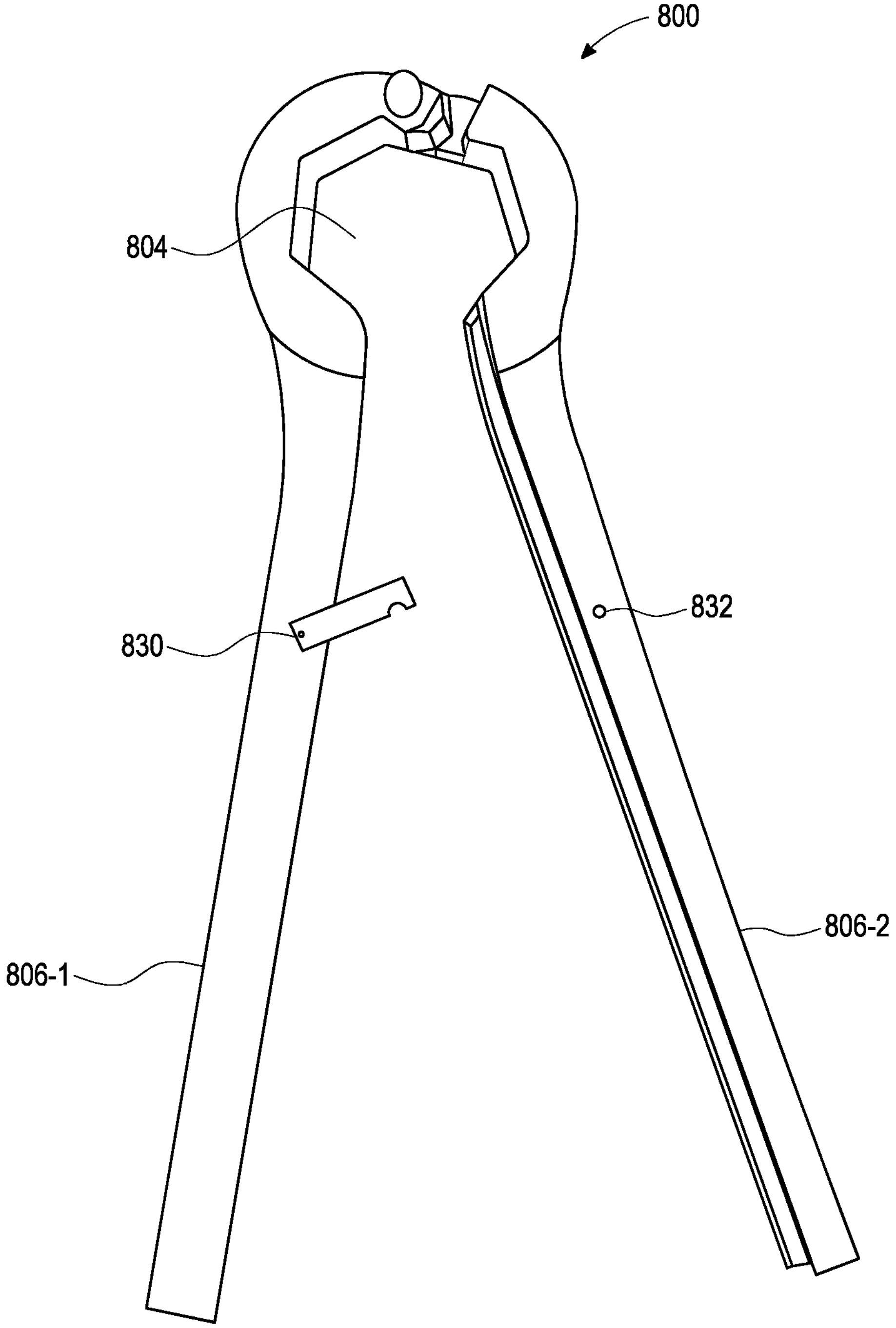
FIG. 8 is a perspective view illustration of a further additional embodiment of a hinged wrench.

FIG. 8 is a perspective view illustration of a further additional embodiment of a hinged wrench 800. As in other embodiments, hinged wrench 800 includes a variable box head 804, and handles 806-1 and 806-2 with reciprocal lips. In this case, a clasp 830 is provided and may hook over a peg 832 (or pin, post, or similar) when hinged wrench 800 is closed. As with securing loop 726 of hinged wrench 700 in FIG. 7, clasp 830 may supplement the grip strength of the human user and provide a more secure grip on the fastener.

Figure 9:
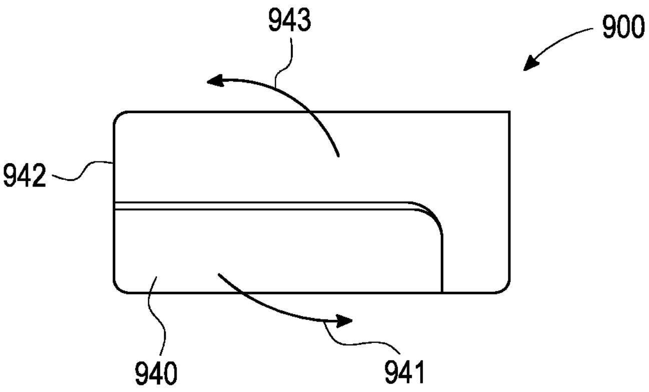
FIG. 9 is a bottom view illustration of a further additional embodiment of a hinged wrench.

FIG. 9 is a bottom view illustration of a further additional embodiment of a hinged wrench 900. In the embodiment of FIG. 9, hinged wrench 900 may not be manufactured from two identical pieces. Rather, a spring bias or other force may be used to supplement the user's grip strength. In this case, rather than reciprocal lips, handle 942 slides over and clasps around handle 940. Spring force may be used to secure handle 942 over handle 940. When the user is done manipulating the fastener, then the user may for example use thumb force to pop handle 942 up over handle 940. Handle 942 swings up and to the left in swing direction 943, while handle 940 swings in swing direction 941. Hinged wrench 900 provides a self-securing mechanism for the handle to supplement the user's grip strength.

Figure 10:
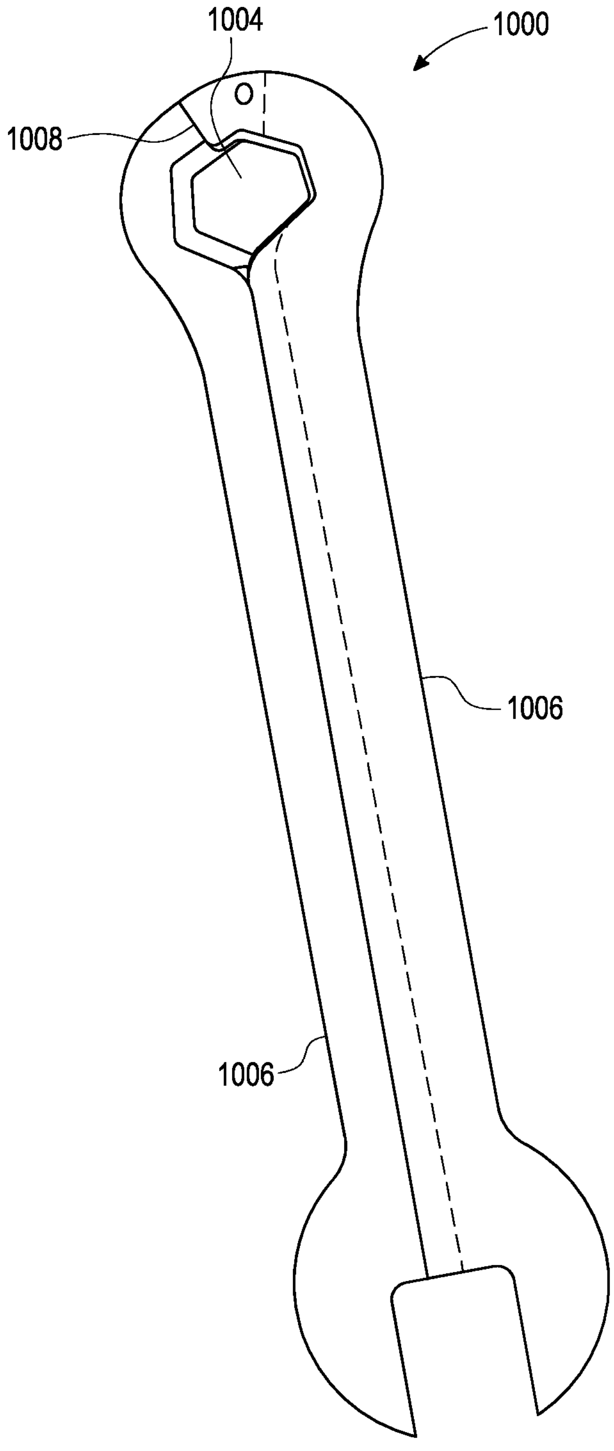
FIG. 10 is a perspective view illustration of a further additional embodiment of a hinged wrench.

FIG. 10 is a perspective view illustration of a further embodiment of a hinged wrench 1000. As with other embodiments, hinged wrench 1000 includes a variable box head 1004, a handle 1006, and reciprocal lips 1008. In this example, hinged wrench 1000 is a combination wrench with both a box head and an open head 1050. Open head 1050 is a variable open head which, when closed, operates like a standard open-ended wrench. Hinged wrench 1000 may provide an embodiment that realizes the advantages of a standard combination wrench by providing both an open head and a box head.

The foregoing outlines features of several embodiments so that those skilled in the art may better understand various aspects of the present disclosure. The foregoing detailed description sets forth examples of apparatuses, methods, and systems relating to a system for manufacturing a hinged wrench in accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to an embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without the specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, and equipment options.

There are also provided herein certain methods, illustrated for example in flow charts and/or flow diagrams. The order or operations disclosed in these methods discloses one illustrative ordering that may be used in some embodiments, but this ordering is not intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected elements. Such elements are selected to illustrate specific information to facilitate the description. The inclusion of an element in the FIGURES is not intended to imply that the element must appear in the disclosure as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A wrench, comprising a first body piece and a second body piece, wherein the first body piece and second body piece are of substantially identical construction, and wherein the second body piece is oriented 180° from the first body piece along a longitudinal axis, and wherein the first and second body pieces comprise respective head pieces that, when closed together, form a box-end wrench head, wherein the first and second body pieces are joined at a pivot joint on the box-end wrench head, and wherein the first and second body pieces comprise respective handle pieces, wherein the first handle piece and second handle piece form respective overlapping lips.

2. The wrench of claim 1, wherein the first and second body pieces comprise respective lips on respective head pieces, and wherein the pivot joint comprises a pin through the respective lips.

3. The wrench of claim 1, wherein the box-end wrench head is a six-point wrench head.

4. The wrench of claim 1, wherein the box-end wrench head is a twelve-point wrench head.

5. The wrench of claim 1, wherein the first and second body pieces are drop forged.

6. The wrench of claim 1, wherein the first and second body pieces are chrome-vanadium.

7. The wrench of claim 1, wherein the first and second body pieces further comprise tail pieces at removed ends from the respective head pieces, wherein the tail pieces, when closed, form an open-ended wrench head.

8. The wrench of claim 7, wherein the open-ended wrench head is a six-point wrench head.

9. The wrench of claim 7, wherein the open-ended wrench head is a twelve-point wrench head.

10. The wrench of claim 1, further comprising securing means to secure the first body piece to the second body piece when closed.

11. The wrench of claim 10, wherein the securing means comprise magnetic means.

12. The wrench of claim 10, wherein the securing means comprise mechanical means.

13. The wrench of claim 12, wherein the mechanical means comprise a clasp.

14. The wrench of claim 12, wherein the mechanical means comprise a loop.

15. A method of manufacturing a wrench, comprising:

forming a first body piece comprising a first head piece and a first handle having a longitudinal lip;

forming a second body piece comprising a second head piece and a second handle, wherein the second body piece is of substantially identical construction to the first body piece;

inverting the second body piece along a longitudinal axis; and pinning the first head piece to the second head piece at a pivot joint, wherein the first head piece and second head piece together form a box-end wrench head, and whereby the longitudinal lip of the first body piece and the longitudinal lip of the second body piece overlap one another.

16. The method of claim 15, wherein forming the first and second body pieces comprises drop forging.

17. The method of claim 15, wherein forming the first and second body pieces comprises casting.

18. A wrench, comprising a first body piece hingedly affixed to a second body piece, wherein the first body piece and second body hinge at a pivot point, wherein the first body piece and second body piece are oriented to form a box wrench head at a proximal end to the pivot point, the box wrench head open in a first pivot orientation and closed in a second pivot orientation, and wherein the first body piece and second body piece have respective distal ends that together form an open wrench head in the second pivot orientation.

19. The wrench of claim 18, wherein the open wrench head is a six-point configuration.

20. The wrench of claim 18, wherein the open wrench head is a twelve-point configuration.

* * * * *